W. S. HAMM.
LANTERN.
APPLICATION FILED JULY 13, 1908.

970,815.

Patented Sept. 20, 1910.

2 SHEETS—SHEET 1.

Witnesses
G. A. Paulenschmidt
Charles B. Gilson

Inventor
Wm. S. Hamm
By Gilson & Gilson
Attys

W. S. HAMM.
LANTERN.
APPLICATION FILED JULY 13, 1908.

970,815.

Patented Sept. 20, 1910.

2 SHEETS—SHEET 2.

Witnesses:

Inventor
Wm. S. Hamm
By Gillson & Gillson
Attys

UNITED STATES PATENT OFFICE.

WILLIAM S. HAMM, OF HUBBARD WOODS, ILLINOIS, ASSIGNOR TO THE ADAMS & WESTLAKE COMPANY, OF CHICAGO, ILLINOIS, A CORPORATION OF ILLINOIS.

LANTERN.

970,815.  Specification of Letters Patent.  Patented Sept. 20, 1910.

Application filed July 13, 1908. Serial No. 443,359.

*To all whom it may concern:*

Be it known that I, WILLIAM S. HAMM, a citizen of the United States, and resident of Hubbard Woods, county of Cook, and State of Illinois, have invented certain new and useful Improvements in Lanterns, of which the following is a specification, and which are illustrated in the accompanying drawings, forming a part thereof.

The invention relates to lanterns especially adapted for the use of trainmen, and has particular reference to the bail or handle and the means of attachment thereof to a lantern frame.

The object of the invention is to provide a lantern with a detachable handle which may be connected either rigidly or pivotally; and it consists of the structure hereinafter described, and which is illustrated in the accompanying drawings, in which—

Figure 1:
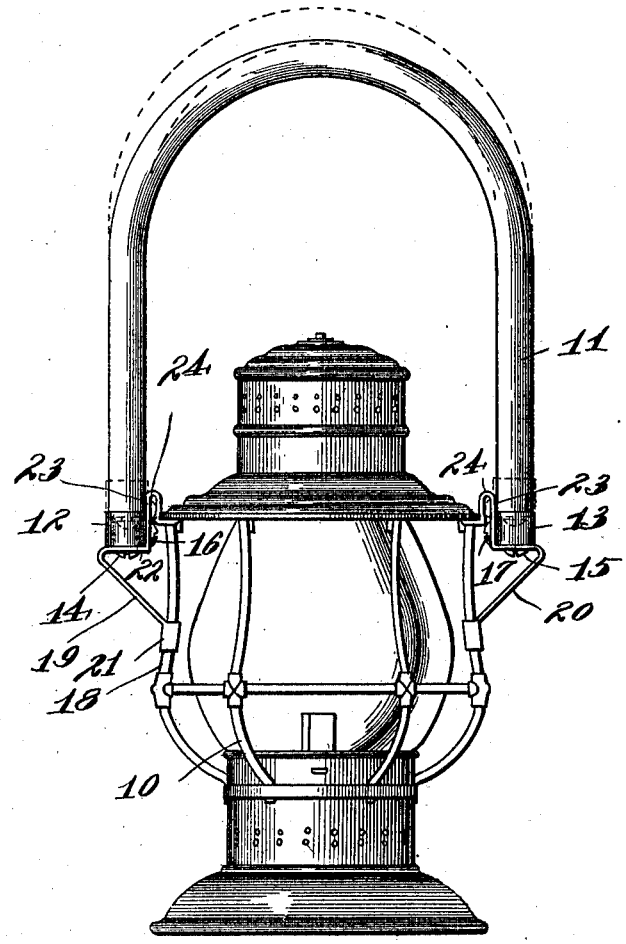
Figure 2:
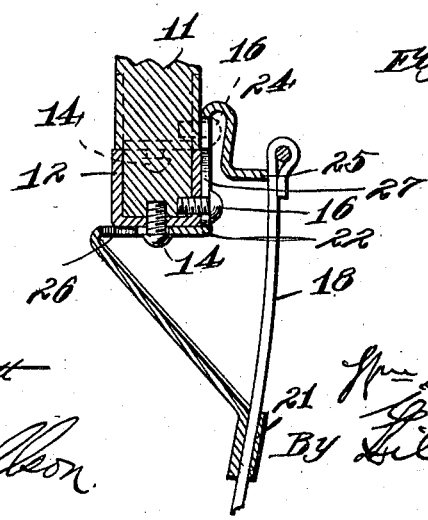
Figure 3:
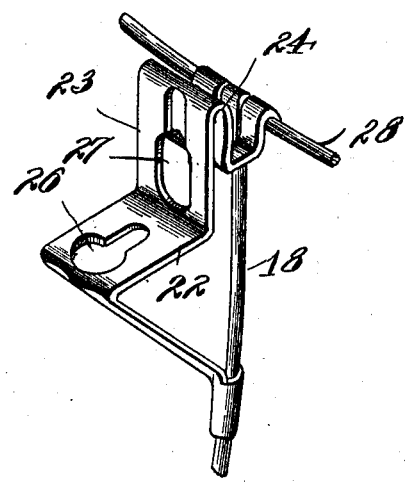
Figure 4:
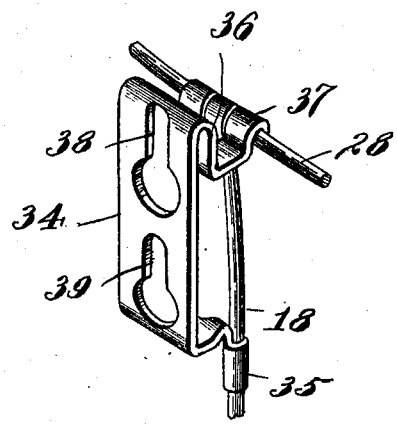
Figure 5:
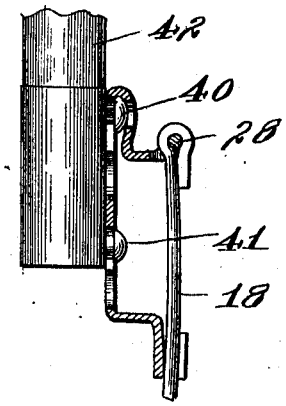
Figure 6:
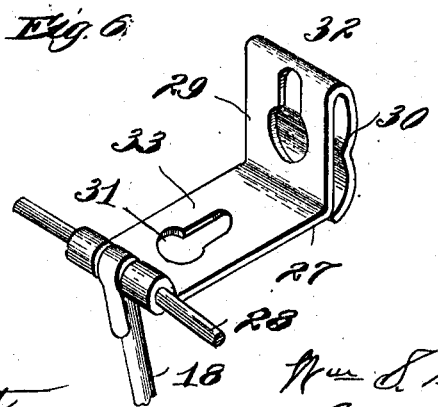

Figure 1 is a side elevation of a lantern embodying the invention; Fig. 2 is a sectional detail of one end of the bail and one form of attaching mechanism; Fig. 3 is a detail perspective of the attaching bracket shown in Figs. 1 and 2; Fig. 4 is a detail perspective of a modified form of attaching bracket; Fig. 5 is a sectional detail of the same; and Fig. 6 is a detail perspective of a further modification of the attaching bracket.

The lantern 10 may be of any preferred form of construction, as shown it is provided with a wire guard-frame or cage for protecting the globe. The bail 11 may be of any suitable material. It is shown as being made of wood, thereby providing ample size for a firm grip. To the lower ends of such a bail there are applied ferrules 12, 13, and T-headed studs, one pair of which, 14, 15, is set in the extreme ends of the bail, the other pair 16, 17, being set in the side of the bail adjacent its ends. These studs are shown as being screws and as being in threaded engagement with both the ferrule and the body of the bail.

To opposite sides of the guard-frame 18 of the lantern there is fixed a pair of brackets 19, 20, each being formed of a strip of sheet metal, the lower end of which, 21, is wrapped about one of the uprights of the guard-frame, the strip then extending upwardly and outwardly a short distance and being folded back horizontally and then vertically to form a seat 22 and a side bearing 23 for the end of the bail. The upper end of the strip of which the bracket is formed is then redoubled upon itself, forming a loop 24, and is secured to the upright 18 of the guard-frame, as shown at 25. T-slots 26, 27, are formed in the seat 22 and bearing face 23, the heads of such slots being at their outer and lower ends, respectively. The two brackets 19, 20, being alike, but one of them is described in detail.

When it is desired to attach a bail rigidly to the lantern, the studs, 14, 15, are inserted within the apertures 26. The bail is so made that its elasticity draws these studs into the contracted portions of the apertures and causes the heads of the studs 16, 17, to enter the apertures 27, thereby preventing the oscillation of the bail.

When it is desired to pivotally connect the bail with the lantern, the studs 14, 15, are withdrawn from the apertures 26 and the studs 16, 17, are inserted into the apertures 27, the head portion of the latter being vertically elongated to permit of their entry when the former studs are out of engagement with the bracket. The bail now being drawn upwardly to bring the studs 16, 17 into the contracted portion of the apertures 27, they serve as pivots upon which it may freely swing. The loop 24 frictionally engages the inner ends of the studs 16, 17, and preferably its throat is slightly contracted so that pressure is required to cause the stud to enter or leave it, thereby preventing the studs from slanting down within the apertures when the lantern is not in use.

In the modification shown in Fig. 6, the form of bracket is somewhat changed. It is still formed of a strip of sheet metal 27, but extends outwardly from the top ring 28 of the guard-frame and is then folded upwardly, as shown at 29, and redoubled upon itself outwardly and downwardly, as at 30. T-headed apertures 31, 32, are formed, respectively, in the outwardly-projecting portion 33 of the bracket and in the upstanding portion 29, their headed portions being directed inwardly and downwardly, respectively.

The bail differs from the construction illustrated in Figs. 1 and 2 only in that the lateral studs 16 and 17 project outwardly instead of inwardly, and the bail is made to normally spread somewhat instead of contracted, thereby insuring the engagement of the lateral studs with the apertures 32. The downward fold 30 of the bracket serves, as before, the purpose of retaining the lateral studs within the contracted portion of the aperture 32 when the bail is arranged to swing.

In the construction illustrated in Figs. 4 and 5, the bracket 34 is formed of a strip of sheet metal, its lower end being folded about the upright 18 of the guard-frame, as shown at 35, and its body portion being offset outwardly and extending upwardly, its upper end being folded inwardly and downwardly to form a loop, as shown at 36, and being then securely engaged with the upper ring 28 of the guard frame, as shown at 37. A pair of T-shaped apertures 38, 39, are formed in the upright or body portion of the bracket, one above the other, their headed portions being directed downwardly. The T-headed studs 40, 41, are both set into the side of the bail 42 and project inwardly. When the bail is to be rigidly attached to the lantern, both studs 40, 41, are utilized, engaging, respectively, the slots 38, 39, and, the bail being drawn upwardly, the head of the upper stud is engaged by the loop 36, and frictionally holds the bail in place. When it is desired to pivotally attach the bail the lower stud 41 only is used and is inserted into the upper aperture 38, the loop 36 serving, as before, to frictionally hold it in place.

I claim as my invention—

1. In a lantern, in combination, a pair of bail-attaching brackets one at each side of the lantern and each having a pair of apertures, a bail, a pair of studs at each end of the bail and engageable with the bracket apertures either simultaneously or singly.

2. In a lantern, in combination, a bail, a pair of brackets each having a pair of T-shaped apertures, a pair of headed studs secured to the bail at each of its ends and being engageable with the apertures simultaneously or separately.

3. In a lantern, in combination, a frame, a bracket or bail-lug attached to the frame and comprising an upstanding loop one wall of which has a vertical slot, a bail having a laterally-projecting headed stud adapted to enter the aperture, the head of the stud being of greater thickness than the width of the throat of the loop.

4. In a lantern, in combination, a frame, a bracket attached thereto and being of sheet metal and having a horizontal shoulder, and a vertical wall rising therefrom, such shoulder and wall each having a T-shaped aperture, the contracted end of the aperture of the shoulder being adjacent the wall, and a bail having a laterally and a longitudinally-projecting headed stud adapted to engage such apertures.

5. In a lantern, in combination, a frame, a pair of brackets attached thereto and having outstanding slotted sole-plates, the slots having their inner ends contracted, and a bail having headed ends for engaging the bracket slots, and shoulders for bearing upon the upper face of the sole-plate, the spread of the bail being normally less than the distance between the wider portions of the slots of the two brackets.

6. In a lantern, in combination, a frame, a pair of brackets attached thereto and having outstanding sole-plates with T-slots, and a bail having headed ends for engaging the bracket slots and shoulders for bearing on the upper face of the sole-plate, the elasticity of the bail normally holding its heads in engagement with the contracted portions of the slots.

WILLIAM S. HAMM.

Witnesses:
LOUIS K. GILLSON,
E. M. KLATCHER.